Patented July 18, 1950

2,515,739

UNITED STATES PATENT OFFICE 2,515,739

METHOD OF TREATING TALL OIL

Jerry John Smerechniak and George William Barlow, Stamford, Conn.; said Smerechniak now by change of name Jerry J. Sherwood; assignors to American Cyanamid Company, New York, N. Y., a corporation of Maine No Drawing. Application March 6, 1947, Serial No. 732,932

3 Claims. (Cl. 260—97.7)

This invention relates to a process for refining tall oil and more particularly, to a process of treating tall oil to improve its color and odor.

Tall oil is a by-product obtained from sulfate wood pulp digestion. It consists mainly of fatty acids, fatty acid soaps, rosin acids and unsaponified fats, and is dark in color due to the presence of color bodies.

In the past, methods have been proposed for the removal of color bodies from tall oil in order to produce an improved product which would be more attractive commercially. For example, tall oil to be refined has been treated with adsorbents such as activated clays and/or activated carbon. While this type treatment, of course, will remove some of the color, the adsorbents retain a large proportion of the tall oil and the procedure is therefore too costly to be entirely satisfactory.

It is an object of the present invention to provide an improved process for refining tall oil.

It is a further object of the present invention to provide a simple and economical process for refining tall oil.

It is still another object of the present invention to provide a process for producing a deodorized, light colored tall oil from a odoriferous, dark colored tall oil.

Still another object of the present invention is the provision of a process for refining tall oil which does not require elaborate plant equipment.

It is another object of the present invention to produce good yields of a deodorized, light colored tall oil.

These and other objects are attained by heating tall oil with a quantity of metallic zinc. It is often desirable to accompany the zinc and heat treatment with bubbling of an inert gas through the liquid mixture.

The invention will be described in greater detail in conjunction with the following specific examples in which the proportions are given in parts by weight unless otherwise indicated. The examples are merely illustrative and it is not intended that the details thereof should be restrictive of the scope of the invention.

Example 1

650 parts of Armour's Neo-Fat D-242[1]
5.4 parts of finely divided zinc (0.83%)

[1] A mixture of tall oil fatty acids and rosin acids having an acid value of 178, 61.9% rosin acids and a color of 7 on the Hellige varnish scale.

The Neo-Fat is agitated with the zinc at 200°– 210° C. while carbon dioxide gas is bubbled through the mixture. After two hours, the characteristic foul odor of tall oil is not noticeable in the vapors. The mixture is filtered in order to remove unreacted zinc and the filtered liquid found to have a color of 2–3 L on the Hellige scale. It is interesting to note that the acid value of the tall oil remains substantially unchanged, the purified tall oil having an acid value of 181.2.

Example 2

1,146 parts of Armour's Neo-Fat D-242[1]
12.06 parts of metallic zinc dust (1.05%)

[1] A mixture of tall oil fatty acids and rosin acids having an acid value of 178, 61.9% rosin acids and a color of 7 on the Hellige varnish scale.

The Neo-Fat is agitated with successive portions of zinc at temperatures ranging from 202°–207° C. while carbon dioxide is bubbled through the mixture. The following color changes are observed over a 6-hour period:

| Zinc, Parts Added | Hours | Color |
|---|---|---|
| 0 | 0 | 7 |
| 1.21 | 1 | 7L |
|  | 2 | 6–7L |
| 1.25 | 3 | 6–7L |
|  | 4 | 6 |
| 2.38 | 5 | 6 |
| 4.89 | 6 | 6L |

Thus, by comparing the above results with those of Example 1 it will be apparent that addition of the zinc in small successive portions is not generally as effective as the addition of the entire amount of zinc in one portion but either procedure may be utilized in carrying out the process of the present invention.

After the 6 hours of heating, the tall oil treated as described above is permitted to cool down. When reheated to 210° C. in the absence of carbon dioxide, the material darkens and rapidly becomes too dark to obtain any reading on the Hellige scale. The addition of zinc at this point in the presence of a stream of carbon dioxide gas restores the tall oil to its previous color.

Example 3

2000 parts of Armour's Neo-Fat D-242[1]
20 parts of metallic zinc dust (1.0%)

[1] A mixture of tall oil fatty acids and rosin acids having an acid value of 181, 69.0% rosin acids and a color of 7 on the Hellige varnish scale.

The Neo-Fat and the zinc are mixed together and the mixture is heated, with agitation, to about 200°–205° C. In only 5 minutes time, a color change from the original 7 to 6L–6 is observed.

*Example 4*

591 parts of West Virginia Pulp & Paper Company's Indusoil [1]
6.63 parts of metallic zinc dust (1.12%)

[1] A refined tall oil which is a mixture of tall oil fatty acids and rosin acids contained from 34–38% rosin acids and having a color on the Hellige scale of 6L.

The Indusoil and the zinc are heated at 190°–198° C. for ¾ hour in the presence of a stream of carbon dioxide gas. At the end of this period the odor of the tall oil has improved and the color has changed from 6L to 4L.

*Example 5*

573 parts of crude tall oil from the Chesapeake Camp Corporation
13.6 parts of metallic zinc dust (2.38%)

The crude tall oil which is black in color has a vile characteristic odor. After heating for 1 hour at 200°–210° C. in the presence of carbon dioxide gas with 6.6 parts (1.15%) of the metallic zinc, the mixture is still dark. The remainder of the zinc is then added and considerable foaming takes place with the evolution of gas. The mixture is heated for an additional 4 hours at the same temperature whereupon a definite color improvement is obtained. The color value of the treated tall oil on the Hellige scale is 9 but this value, even though high, represents a decided improvement as a result of the treatment since light is visible through the treated mixture which appears to be red whereas no light is visible through a similar thickness of the black, opaque original sample. The odor improvement is most marked, the final product having only a very mild odor.

*Example 6*

644 parts of Neo-Fat D–242 [1]
6.44 parts of metallic zinc dust (1.0%)

[1] A mixture of tall oil fatty acids and rosin acids having an acid value of 172, a Hellige color of 7L and containing 71.4% rosin acids.

The Neo-Fat is heated for 1½ hours at 190°–198° C. During this period the color darkens to 8–9 L. Twenty minutes additional heating while bubbling carbon dioxide gas through the mixture results in no color change. The zinc is then added and in 10 minutes at 188°–198° C. the color changes back to the original 7L.

While as little zinc as 0.1% by weight of the tall oil shows some improvement in odor and color (Example 2), we prefer the use of about 1% by weight of zinc. In general, amounts ranging from about 0.1% to about 2.5% may be used effectively, larger amounts presenting no advantage and merely resulting in an increased recovery of unreacted zinc after the purification treatment.

The zinc is preferably added in a finely divided form as zinc dust, zinc powder or mossy zinc. Zinc in any other desirable form may also be used as, for example, zinc turnings.

The temperature used for treatment of the tall oil with metallic zinc is preferably about 200° C., but temperatures ranging from 150°–275° C. are effective.

The time required for purification of the tall oil is not critical and will vary depending upon the temperature, the quantity of color bodies and odoriferous material present in the tall oil, the degree of agitation, and the rate of bubbling the inert gas through the liquid if an inert gas is used in conjunction with the heat treatment in the presence of zinc.

It is not necessary that the refining process be carried out in the presence of an inert atmosphere although it is preferable since contact with air tends to cause darkening of the tall oil. We prefer conducting the purification in an inert atmosphere to avoid this darkening effect and also as an aid for the removal of volatile impurities. The carbon dioxide gas of the examples may be replaced by nitrogen, hydrogen, dry steam, etc.

If desired, solvents may be used to reduce the viscosity of the tall oil, especially at lower temperatures, and to maintain a temperature fixed by the boiling point of the mixture. This is advantageous in many cases since improved and more intimate contact of the liquid with the zinc metal particles can thus be attained where lower temperatures may be preferred. Suitable solvents include non-aqueous solvents such as monocyclic aromatic hydrocarbons, i. e., benzene, toluene, xylene, etc., petroleum hydrocarbons, terpenes, etc.

The process of the present invention is applicable to both crude and refined tall oils, to tall oil fatty acids and to mixtures of tall oil fatty acids with rosin acids. The term "tall oil" as used in the present specification and claims is intended to cover and include all such mixtures regardless of the relative proportions of ingredients.

It is an advantage of the present invention that by its process a deodorized, light colored tall oil may be produced from an odoriferous, colored tall oil. Good yields of this improved material are obtained with very little loss as occurs in other processes due to retention of the tall oil by the adsorbent clay or carbon material used for purification. Moreover, due to the fact that the present process is carried out in non-aqueous solution the product obtained is free of moisture.

Another advantage of the present invention is the possibility of recovery of unreacted zinc for reuse in subsequent purification processes.

A further advantage of the present invention is the production of a valuable intermediate material. Among the general uses for tall oil may be mentioned the manufacture of soap, resins, varnishes and fruit sprays. By improving the color and removing the objectionable odor of tall oil, a product of enhanced value, particularly for utilization in the preparation of synthetic resins where a dark color is undesirable, in the preparation of soap stock, etc., is obtained.

We claim:

1. A process for treating a composition containing tall oil fatty acids to improve its color and odor which comprises heating said composition with metallic zinc at a temperature of from about 150°–275° C., the amount of metallic zinc used varying from about 0.1% to about 2.5% by weight, based on the weight of tall oil.

2. A process for treating a composition containing tall oil fatty acids to improve its color and odor which comprises heating said composition with metallic zinc at a temperature of from about 150° C. to about 275° C., the amount of metallic zinc used ranging from about 0.1% to about 2.5% by weight, based on the weight of tall oil while maintaining the tall oil under an inert atmosphere.

3. A process for treating a composition containing tall oil fatty acids to improve its color and odor which comprises heating said composition under an inert atmosphere with about 1% by weight of metallic zinc at a temperature of from about 150° C. to about 275° C.

JERRY JOHN SMERECHNIAK.
GEORGE WILLIAM BARLOW.

REFERENCES CITED

The following references are of record in the file of this patent:

UNITED STATES PATENTS

| Number | Name | Date |
|---|---|---|
| 1,132,710 | Ellis | Mar. 25, 1915 |
| 2,336,472 | Dressler | Dec. 14, 1943 |
| 2,371,307 | Mitchell | Mar. 13, 1945 |
| 2,394,416 | Zeiss | Feb. 5, 1946 |
| 2,413,009 | Taussky | Dec. 24, 1946 |

OTHER REFERENCES

Brocklesby, "Marine Animal Oils," 1941, pages 274–276.